Patented Feb. 23, 1943

2,312,221

UNITED STATES PATENT OFFICE 2,312,221

PROCESS FOR TREATING INDUSTRIAL COOLING WATER

Charles J. Sprigman, Woodbury, N. J., and Sheppard T. Powell, Baltimore, Md., assignors to Socony-Vacuum Oil Company, Incorporated, New York, N. Y., a corporation of New York No Drawing. Application August 9, 1940, Serial No. 351,966

6 Claims. (Cl. 210—23)

This invention relates to a process for treating cooling water and liquid wastes for the purpose of improving the performance of heat exchange apparatus and the like, and the separation of oil from waste cooling water during passage through oil separators or ponds.

In various industrial processes, as for example the refining of petroleum, large amounts of water are used for cooling heat exchangers in which the product is cooled or condensed, and water is used for numerous other purposes in the process. In some cases the water is discharged, after absorbing heat, into a spray pond, oil separator, or reservoir. The water may be recirculated through the heat exchangers or discharged to waste. All effluents of this kind are liable to become contaminated with oil from leakage of equipment, drippings, etc. To improve the quality of the water and minimize pollution to streams or other bodies of water receiving it, the water must be discharged through oil separators which promote the coalescence of small droplets of oil into sufficiently large accumulations to be removed by skimming, filtration or other means of purification.

The water system thus described generally contains various kinds of microscopic organisms that have a number of objectionable characteristics: (1) they develop upon the surfaces of heat transfer equipment forming an adherent slime that reduces the efficiency of apparatus; (2) the algae and other growths adsorb the oil and promote the retention of a film which reduces the efficiency of the oil separators; and (3) certain of these organisms bring out biochemical reactions, resulting in the formation of objectionable gaseous compounds, many of which detrimentally effect the separation of oil, subsidence of suspended solids, or cause other troublesome problems.

The elimination of slimes from condensers and heat exchange equipment can be accomplished by chlorination of the water, and this has long been practised in various industries. Chlorination will also destroy organisms in other parts of the system besides the heat transfer surfaces, but the consumption of chlorine by reducing substances in the water rapidly exhausts this disinfectant near the point of application so that some parts of the system do not receive adequate treatment. This may be remedied by substituting chloramines for chlorine as the sterilizing agent. Some of these latter compounds are less readily destroyed by reducing agents, and persist longer in the water, thus extending their beneficial effect to parts more remote from the point of treatment. Chloramines may be added as such, but it is preferable to form them in the water by the separate addition of chlorine and ammonia.

The use of ammonia or its compounds in heat transfer equipment containing copper or copper alloys is objectionable because these metals may be attacked by ammonia, resulting in the formation of soluble complex ions and other reactions which are corrosive. For this reason it is undesirable to apply the chloramine treatment to the system prior to the heat exchange equipment, since if the ammonia and chlorine doses are not properly balanced at all times, excessive amounts of free ammonia may occur, in which case the copper alloys can be readily attacked. Moreover, if the chloramines are employed, their bacterial action may not be as effective as chlorine because of the retarded sterilizing effect.

It is one of the objects of our invention to sterilize the water in a cooling system of this kind by a process which will advantageously utilize the specific properties of chlorine for removal of slimes from heat transfer surfaces and also the properties of chloramines for sterilization of the main body of water in the system.

It is a further object of our invention to so treat the water in a system of this kind as to permit maximum recovery of oil by eliminating interfering organisms.

Another object of our invention is to utilize the sterilizing agents, chlorine and ammonia, most economically and effectively in the various parts of the system. Other objects of the invention will be apparent from the description of its operation.

According to one embodiment of our invention, chlorine is added to industrial cooling water before it enters heat exchange equipment, the addition being made continuously or intermittently, and in sufficient amount to keep the surfaces of the equipment free of slime-producing organisms. At the outlet from the heat exchange apparatus sufficient ammonia is added, continuously or intermittently, to the water to combine with the residual chlorine therein and form chloramines.

In the practice of our invention we add sufficient ammonia to the water to combine with all of the chlorine leaving the heat exchange apparatus. However, if the chlorine at this point is insufficient for the chloramine treatment of the effluent supply, more chlorine and ammonia (or chloramines) may be added. As indicated, the chlorine, ammonia and chloramines may be added continuously or intermittently, but they are preferably added intermittently for the reasons understood in the art. In another embodiment of our invention only the effluent water may be treated as will be pointed out in detail hereinafter.

The chloramines thus formed are sufficiently stable to remain in the water until remote parts of the system are reached and to exert a sterilizing effect for a considerable period of time. The growth of algae to which droplets of oil adhere is thereby prevented and the removal of oil by separators is facilitated. This results in a recovery of larger amounts of oil and the reduction in the pollution of water into which the discharge from the oil separators is emptied.

A still further advantage of our invention results from the fact that the formation of the chloramines may be made by the addition of ammonia from waste by-products such as spent ammonia liquors, power house stack gases, etc., that normally are available around the plant or refinery. Therefore, it is to be noted that we take full advantage of any residual chlorine in the water and even increase its effectiveness and may do so by merely using a by-product ammonia.

In an oil refinery, for instance, there might be said to be two general types of water systems: namely, a circulatory system wherein water is drawn from a given source as needed, sent through the desired equipment, passed to a spray pond for cooling, and then returned after separation of oil to the equipment for reuse, and a straight-through system wherein water is drawn from the given source, passed through the desired equipment, and then discharged to oil separators from which it is passed to waste.

The advantages of our process for a circulatory system probably are readily apparent. On the other hand, in the straight-through system, where the water leaving the equipment goes to a pond or oil separator and then is discharged to waste—for example, is discharged into a river or creek—the advantages are not obvious because heretofore it seemingly would make little difference whether algae growth occurred in such separators. Therefore, while it is known to treat water passing through condensers with chloramines to keep the condenser surfaces free of organisms and while it is known to sterilize city water supplies with chloramines, the problems there involved are not present at the oil separators of an oil refinery, where the water is discharged to waste from the separators. Accordingly, the knowledge that it is desirable to treat the water going to such oil separators with chloramines is the result of a surprising discovery which has been suggested hereinabove but not fully discussed.

It was found that the waste water which passed through oil separators and was then discharged into a river caused sufficient pollution of the river as to be objectionable to the authorities in charge of river pollution control, regardless of the thoroughness of the oil-skimming operation. After considerable study of this problem it was found that algae in the water absorbed substantial amounts of the oil and passed from the oil separators into the river. Bacteria acting upon the algae produced carbon dioxide which inflated the algae. Further, it also is probable that bacterial action on other organic matter to produce carbon dioxide, and the mechanical action present due to the turbulence of the waste water going through the outlets of the oil separators, caused increased buoyancy of the algae containing the absorbed oil. In any event, upon reaching the river, the algae rose to the surface and literally exploded because of the reduced hydrostatic pressure, thereby releasing their absorbed oil upon the river surface, and the shattered algae immediately sank out of sight.

After the above discovery was made that algae were carrying oil into the river, and the waste water was sterilized with chloramines so as to free the oil separators of algae, it was found that oil pollution of the river was eliminated and, of course, the oil that formerly had been lost in the river was retained now in the oil separators.

Accordingly, while it is of advantage and preferable to have the entire water system treated as outlined above so that the condensers and other equipment are maintained free from organic scum and slime, whereby such equipment operates at all times at full efficiency and without having to be cleaned periodically, definite advantages with respect to stream pollution and loss of oil may be obtained by only treating the waste water discharged from such equipment with chloramines before separating oil and discharging the water to waste. Likewise while it is preferred to use chloramines as the algaecides in this latter treatment, particularly when combined with a prior chlorine treatment, it will be realized other algaecides could be used to obtain the increased oil recovery and reduced pollution. For a general discussion of the action of algaecides see pages 386 to 400, G. C. Whipple, Microscopy of Drinking Water, revised by G. M. Fair and M. C. Whipple, fourth edition, John Wiley & Sons, Incorporated.

Our invention is not limited to the use of liquid or gaseous chlorine as a source of chlorine and liquid or gaseous ammonia as a source of ammonia, nor their application by any specific equipment. We may use, for example, any source of available chlorine such as the hypochlorides of alkali metals or alkaline earths, or chlorine generated at the point of application by known processes. As a source of ammonia we may use compressed gaseous ammonia, ammonium salts, such as the sulphate or the chloride, or waste gases rich in ammonia compounds. In the claims we intend to include all of these possibilities by the terms chlorine and ammonia.

Again, in the claims wherein we speak of sterilizing the water we mean that sufficient reagent has been added to the water to maintain the system free or substantially free of scum and slime forming organisms and algae and the like as is well understood in the art of treating industrial cooling waters.

We claim:

1. In a process wherein water discharged from a cooling system containing a substantial amount of oil is passed to an oil separator and therein separated from oil which is removed therefrom and the water then discharged to waste, the improvement which comprises adding sufficient chloramines to said water after leaving the cooling system and before leaving said separator to maintain such water substantially free of algae and thereby decrease the amount of oil carried to waste.

2. In a process wherein water discharged from a petroleum refinery cooling system is passed to an oil separator wherein oil is separated from water and the oil is removed therefrom and the water then discharged to waste, the improvement which comprises maintaining a sufficient amount of chloramines in the water in said separator that the separator remains free of algae whereby the amount of oil carried to waste is decreased.

3. The process of sterilizing the water in a cooling system wherein the water picks up a substantial amount of oil which comprises adding chlorine to the water entering heat exchange equipment to maintain the surfaces of such equipment free of organic scum and slime, passing the water discharged from the heat exchange equipment to an oil separator wherein oil is separated from the water and removed from the water system, and maintaining a sufficient amount of chloramines in the water in said separator that the separator remains free of algae whereby the amount of oil recovered is increased.

4. The process of sterilizing the water in a cooling system wherein the water picks up a substantial amount of oil which comprises adding chlorine to the water entering heat exchange equipment to maintain the surfaces of the equipment free of organic scum and slime, passing the water discharged from the heat exchange equipment to an oil separator wherein oil is separated and removed from the water before discharging the water to waste, and adding sufficient chloramines to said water after it leaves the heat exchange equipment and before it leaves said separator that the separator remains free of algae whereby the amount of oil carried to waste is decreased.

5. The process of sterilizing the water in an oil refinery cooling system which comprises adding sufficient chlorine to the water entering heat exchange equipment to maintain the surfaces of the equipment free of organic scum and slime, and to leave residual chlorine in the water discharged from the heat exchange equipment, passing the water discharged from the heat exchange equipment to an oil separator wherein oil is separated and removed from water before discharging the water to waste, and adding sufficient chloramines, at least a portion of which is formed by reacting ammonia with said residual chlorine, to said water after it leaves the heat exchange equipment and before it leaves said separator that the separator remains free of algae whereby the amount of oil carried to waste is decreased.

6. In a process wherein water discharged from a cooling system containing a substantial amount of oil is passed to an oil separator and the oil is separated therein and removed therefrom prior to discharge of the water to waste, the improvement which comprises adding to said water after it leaves the cooling system and prior to the oil water separation in said separator an algaecide having a specific toxic effect on cellular organic material and a disintegrating effect on the cell walls thereof in sufficient quantities to disintegrate cellular organic mater so as to increase oil recovery, thereafter separating said oil and water and passing the latter to waste substantially free of algae absorbed oil whereby the production of oil slimes on waste water is prevented.

CHARLES J. SPRIGMAN.
SHEPPARD T. POWELL.